F. L. STUART.
CONVEYER.
APPLICATION FILED MAY 4, 1918.

1,278,055.

Patented Sept. 3, 1918.
3 SHEETS—SHEET 1.

Inventor
Francis Lee Stuart
By his Attorneys
Baldwin & Wight

F. L. STUART.
CONVEYER.
APPLICATION FILED MAY 4, 1918.

1,278,055.

Patented Sept. 3, 1918.
3 SHEETS—SHEET 2.

Inventor
Francis Lee Stuart,
By his Attorneys.
Baldwin Wight

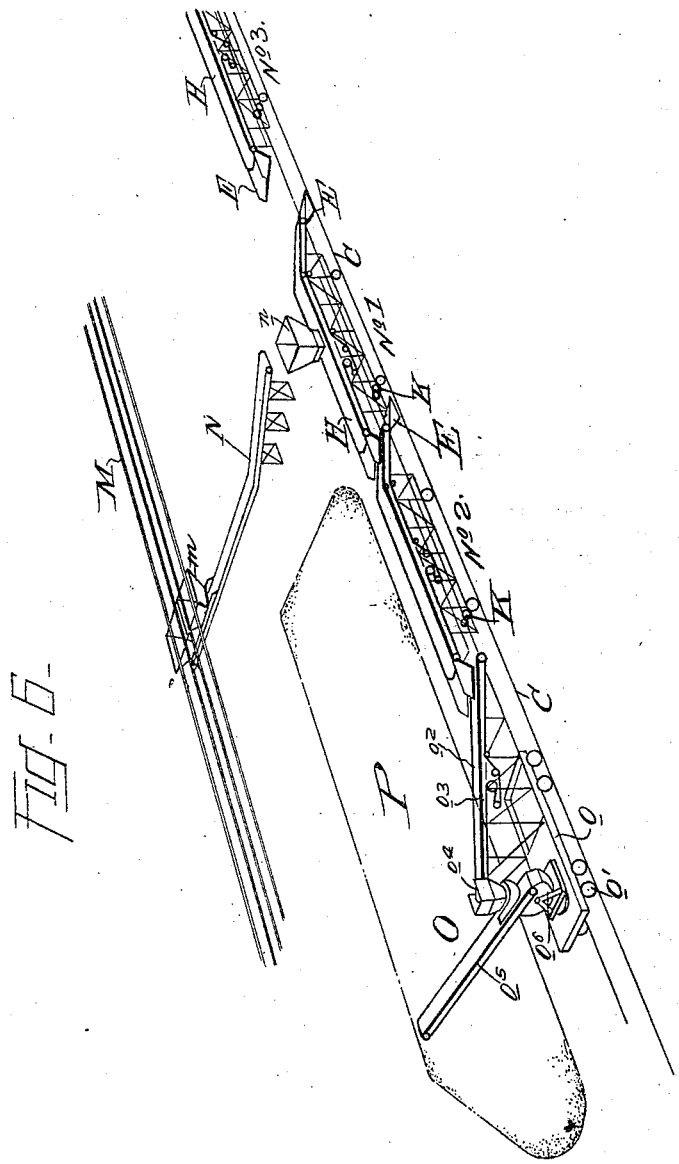

UNITED STATES PATENT OFFICE.

FRANCIS LEE STUART, OF WASHINGTON, DISTRICT OF COLUMBIA, ASSIGNOR TO INTERNATIONAL CONVEYOR CORPORATION, OF NEW YORK, N. Y.

CONVEYER.

1,278,055.  Specification of Letters Patent.  Patented Sept. 3, 1918.

Application filed May 4, 1918. Serial No. 232,514.

*To all whom it may concern:*

Be it known that I, FRANCIS LEE STUART, a citizen of the United States, residing in Washington, in the District of Columbia, have invented certain new and useful Improvements in Conveyers, of which the following is a specification.

This invention relates to conveyers for transferring material from a source of supply to a place for storage or to carriers for transporting material to other places, and the object of the invention is to provide truck-supported conveyers which may be independently moved by self-contained mechanism from place to place as needed, which carry motor mechanism for operating the conveying means and which may deliver to each other when operated in either direction.

Each truck-supported conveyer is a single unit adapted to be associated with others of the same kind so that material may be conveyed either a short or a long distance, any desired number of units being brought into service as needed. The conveying means of each unit while independent of any other conveyer is independently operated and is arranged to receive material from an adjacent conveyer and carry it forward to its destination.

In carrying out my invention, I provide a truck carrying a frame supported on wheels and equipped with motor mechanism for driving the wheels so that the truck may be moved, by self-contained mechanism, to any desired place. The truck frame supports a belt conveyer driven by motor mechanism carried by the truck frame so as to be operated independently of any other conveyer. At each end of the truck frame there is a hinged part which carries a hopper so arranged as to receive material from the belt with which it is associated when held in delivery position or to be lowered to permit material to be delivered to the conveyer with which it is connected. Hand-operated mechanism is provided for raising and lowering the hopper and means is also provided for coupling the unit conveyers together when two or more are associated for conjoint use. Other features of the invention will be hereinafter specified.

In the accompanying drawings:—

Fig. 5 shows a local transverse section on the line 5—5 of Fig. 3.

Fig. 6 shows diagrammatically how a plurality of unit conveyers may be associated with a stacker, and how the unit conveyers may be supplied with material from a main conveyer. This figure of the drawings also shows how the unit conveyers may be arranged on a single track and how an extra or additional conveyer may be arranged on the same track ready to be brought into service when required.

Figure 1:
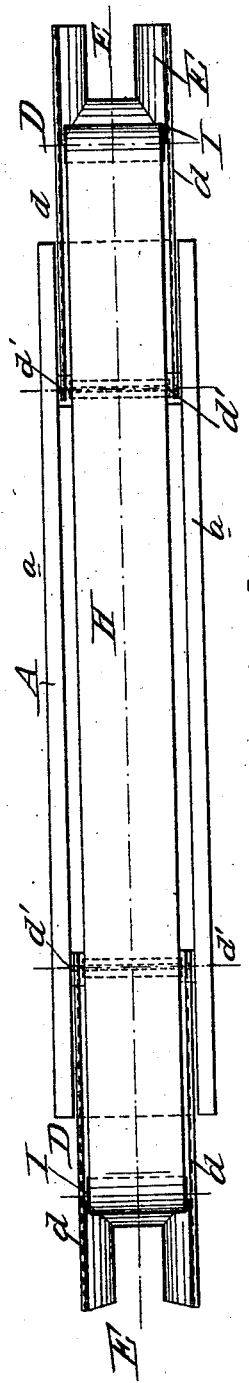
Figure 1 is a plan view of a unit conveyer embodying my improvements.
Figure 2:
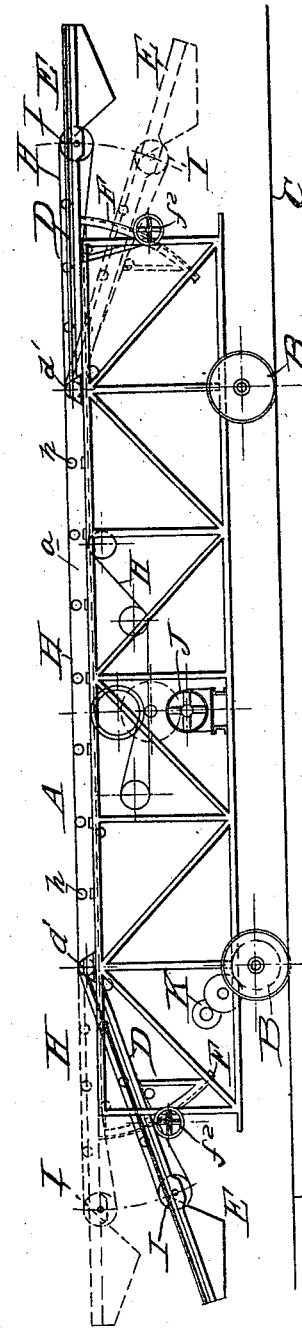
Fig. 2 shows a side elevation thereof, dotted lines showing different positions of the hoppers.
Figure 3:
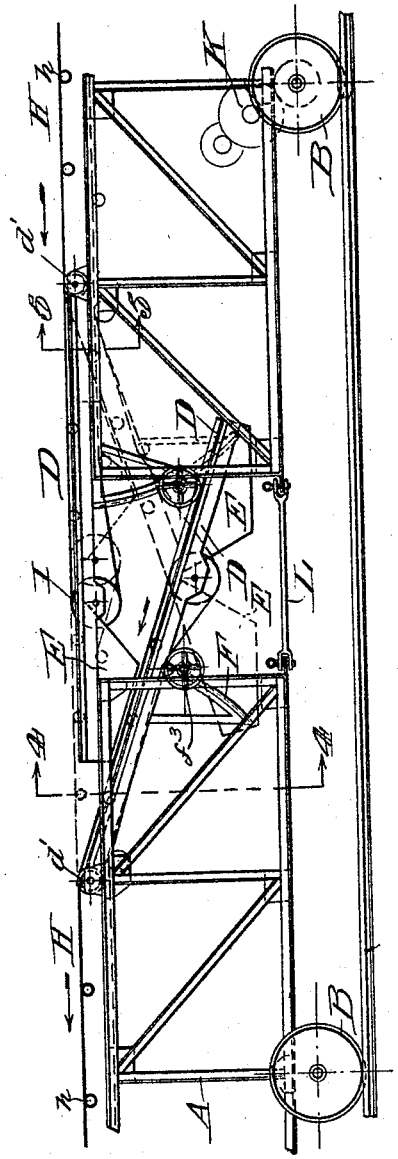
Fig. 3 is a view on an enlarged scale showing portions of two unit conveyers coupled together and arranged to deliver material from one conveyer to the other.
Figure 3:
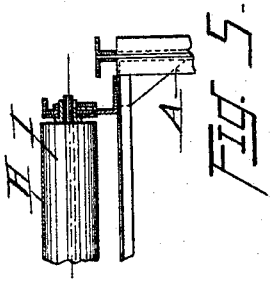
Figure 4:
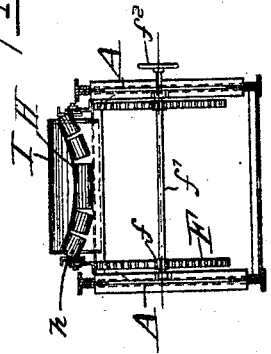
Fig. 4 shows a vertical transverse section on the line 4—4 of Fig. 3.

Each unit conveyer comprises a truck A supported on wheels B, adapted to traverse a track C. The truck frame may be constructed in any suitable way, and it extends transversely across the axes of the wheels. At each end the truck frame is provided with a hinged section D, carrying a hopper E. The section D comprises side bars $d$, hinged at $d'$ to the upper part of the truck frame a short distance from the end thereof. The side bars are adapted to be raised and lowered inside the side bars $a$ of the truck frame. In order to raise and lower the hinged sections, I provide each of them with toothed segments F with which engage pinions $f$ on a shaft $f'$, carrying a hand-wheel $f^2$. Fig. 2 of the drawings indicates the raised and lowered positions of the hinged sections. The hoppers E are preferably of the form shown, their outer ends being open as well as being provided with open bottoms. Each truck carries a conveyer belt H which is supported on its upper run by rollers $h$ and at each end the belt passes around a roller I mounted in the hinged section between the side bars $d$ just over the inner end of the hopper E. The return portion of the belt is suitably guided and is connected with motor mechanism J, by which it is driven. The truck may be propelled by motor mechanism K of any suitable kind operatively connected with the wheels. By this motor mechanism the truck may be propelled on the track C to any desired extent. It will be observed that a portion of the belt H at each end may be raised and lowered with the hinged section D. When said section with the belt is in its raised position the belt may deliver material through the hopper E. When the hinged section is lowered to the dotted line position shown in Fig. 3 the belt is in position to receive material from an adjacent unit conveyer. The manner in which two unit conveyers are connected and associated is indicated in Fig. 3. The belt H is supposed to move in the direction indicated by the arrow. The hinged section D of the unit conveyer on the right-hand side of Fig. 3 is raised, while the hinged section of the unit conveyer on the left-hand side of Fig. 3 is depressed or lowered. Material carried by the belt H on the first truck in the series will be delivered through its hopper E to the inclined upper run of the belt H on the next unit conveyer and will be carried forward by said conveyer. Fig. 3 also indicates by dotted lines how the hinged section on the unit conveyer at the right of Fig. 3 may be lowered to receiving position when the belt H is made to move in an opposite direction.

When brought together for conjoint operation, the trucks are preferably connected by connecting bars L, which may be readily detached when required.

In Fig. 6 I have indicated one way in which the unit conveyers may be associated with each other and with a conveyer for supplying them and an apparatus for unloading them. In this figure of the drawings M indicates car tracks provided with track hoppers $m$ supplying a main conveyer belt N which delivers to a hopper $n$ which may be mounted on a stationary frame. O indicates an apparatus of suitable kind for delivering material supplied by the unit conveyers to a pile of material P or to other places for storage. The unloading apparatus O is preferably of the kind shown, described and claimed in my application for Patent No. 223,302, filed Mar. 19, 1918. As indicated a truck $o$ having wheels $o'$, traveling on the track C, is provided with a conveyer belt $o^2$, driven by motor mechanism $o^3$, and delivering to a hopper $o^4$ which in turn supplies a delivery conveyer $o^5$, mounted on a turn-table $o^6$. Material fed by the main conveyer N passes through the hopper $n$ and may be delivered to the end or inclined portion of a unit conveyer or to the middle portion thereof between its hinged ends. Material fed to unit conveyer No. 1 is delivered to unit conveyer No. 2, and from this conveyer it passes to the conveyer $o^2$ of the unloading apparatus O. As before stated, the conveyer $o^2$ is independently operated and the conveyer on each one of the unit conveyers is independently operated. When starting a pile of material only one unit conveyer may be used but as the pile increases in length another unit conveyer may be brought into service without in any way interfering with the operation of the main conveyer belt N or with the operation of the conveyer belt on the first unit conveyer in the series. When the size of the pile is still further increased another unit conveyer may be brought into service. This is preferably arranged on the same track C as the other unit conveyers, and in the drawings is numbered 3. It will readily be seen that unit conveyers Nos. 1 and 2 and the unloading apparatus may be moved forward on the track and unit conveyer No. 3 may be brought under its own power under the hopper $n$, receive material therefrom and convey it to unit conveyer No. 1. By reason of the constructions herein specified it will be understood that the material may be conveyed in either direction from the main supplying conveyer N by properly adjusting the mechanism.

I do not herein claim the system of conveying means comprising a main conveyer, unit conveyers and unloading apparatus associated therewith, as such system is claimed in my application for Patent No. 208,355, filed Dec. 22, 1917.

I claim as my invention:

1. A unit conveyer, comprising a wheeled supporting truck, a horizontally arranged belt disposed longitudinally of the truck and having a hinged receiving and delivery portion, a delivery hopper carried by said hinged portion, and means for lowering the hinged portion of the belt from its horizontal delivery position to a receiving position below the horizontal plane of the main portion of the belt.

2. A unit conveyer, comprising a wheeled supporting truck, a horizontally arranged belt conveyer disposed longitudinally of the truck and having a hinged receiving and delivering portion at each end, a hopper carried by each of said hinged portions, and means for lowering each of said hinged portions from its horizontal delivery position to a receiving position below the horizontal plane of the main portion of the belt.

3. A system of loading and unloading, comprising a main conveyer belt, a track arranged transversely to said belt and extending across the longitudinal plane thereof, a series of unit conveyers on said track disposed on each side of the main conveyer belt and each movable on said track across the plane of the belt, means for delivering material from the main conveyer belt to each unit conveyer as it is brought into receiving position, means for delivering material from the unit conveyers to a place of storage, each of said unit conveyers comprising a truck, a conveyer belt and means on each truck for propelling it and for driving its belt, and each of said unit conveyers being provided with means for receiving material from a similar conveyer and for delivering it to another similar conveyer, the conveyers on one side of the main conveyer belt being coupled together for joint operation, while the unit conveyer on the opposite side of said main conveyer belt is movable on its supporting track to a receiving position with relation to the main conveyer belt, and it is also adapted to be coupled with the unit conveyers on the opposite side of said belt.

4. A series of unit conveyers placed end to end and delivering the one to the other, each comprising a wheeled truck, a belt conveyer arranged transversely to the axes of the wheels and having a hinged portion at each end, mechanism for driving the wheels and the belt, and means for lowering the hinged portion of the belt from its raised delivery position to a receiving position below the horizontal plane of the main portion of the belt.

In testimony whereof, I have hereunto subscribed my name.

FRANCIS LEE STUART.